US011720396B2

(12) United States Patent
Ortiz et al.

(10) Patent No.: US 11,720,396 B2
(45) Date of Patent: Aug. 8, 2023

(54) APPLICATION PROGRAMMING INTERFACE (API) REQUEST THROTTLING

(71) Applicant: Twilio Inc., San Francisco, CA (US)

(72) Inventors: Juan Fernández Ortiz, Madrid (ES); Madeleine Genevieve Muscari, Berkeley, CA (US); JoséManuel Felguera Rodriguez, Ciudad Real (ES); Freddy Pena, Madrid (ES); Samuel Moran, San Jose, CA (US); Umer Liqat, Madrid (ES); Jeremy Andrew McEntire, San Francisco, CA (US); Will Mason, Moraga, CA (US)

(73) Assignee: Twillo Inc., San Francisco, CA (US)

( * ) Notice: Subject to any disclaimer, the term of this patent is extended or adjusted under 35 U.S.C. 154(b) by 0 days.

(21) Appl. No.: 17/304,543

(22) Filed: Jun. 22, 2021

(65) Prior Publication Data

US 2022/0405119 A1 Dec. 22, 2022

(51) Int. Cl.
*G06F 15/04* (2006.01)
*G06F 9/48* (2006.01)
*G06F 9/54* (2006.01)

(52) U.S. Cl.
CPC .............. *G06F 9/485* (2013.01); *G06F 9/541* (2013.01); *G06F 9/547* (2013.01)

(58) Field of Classification Search
CPC ........... G06F 9/485; G06F 9/541; G06F 9/547
See application file for complete search history.

(56) References Cited

U.S. PATENT DOCUMENTS

| 2012/0060062 A1* | 3/2012 | Lin ........................ G06Q 10/00 714/48 |
| 2017/0289300 A1* | 10/2017 | Song ........................ H04L 41/24 |
| 2018/0219830 A1* | 8/2018 | O'Brien .................. H04L 51/08 |
| 2018/0316752 A1* | 11/2018 | Hodges ............... H04L 67/1023 |
| 2018/0367585 A1* | 12/2018 | Lu ............................ H04L 65/65 |
| 2020/0050501 A1* | 2/2020 | Cooke ................... G06F 9/5027 |
| 2020/0374365 A1* | 11/2020 | Gandhi ............... H04L 67/1012 |
| 2021/0168091 A1* | 6/2021 | Sugarev .................. H04L 67/02 |

* cited by examiner

*Primary Examiner* — Andy Ho
*Assistant Examiner* — Abdou K Seye
(74) *Attorney, Agent, or Firm* — Lowenstein Sandler LLP

(57) ABSTRACT

Disclosed are systems, methods, and non-transitory computer-readable media for application programming interface (API) request throttling. A request throttling system monitors incoming API requests and applies delays to repeated API requests to avoid an overload and/or disruption in service. Upon receiving an API request from a requesting device, the request throttling system determines a counter value that is used to determine whether to apply a delay to API request. The counter value indicates a number or previous requests received from the requesting device that were directed to the same resource and which resulted in an error. The request throttling system compares the counter value to a threshold value to determine whether to apply a delay to the API request. Applying a delay reduces the speed at which subsequent repeat API requests are received from the requesting device, while still allowing for API requests from the requesting device to be processed.

15 Claims, 9 Drawing Sheets

APPLICATION PROGRAMMING INTERFACE (API) REQUEST THROTTLING

TECHNICAL FIELD

An embodiment of the present subject matter relates generally to application programming interface requests and, more specifically, to application programming interface (API) request throttling.

BACKGROUND

APIs are commonly used to enable communication between various computing systems and/or software. An API defines the kinds of calls or requests that can be used to communicate and interact with a given computing system, how to initiate the calls or request, the data formats that should be used, the conventions to follow, and the like. While APIs are useful for facilitating communication between computing systems, they can also be used for nefarious purposes. For example, APIs can be used to initiate a denial-of-service (DoS) attack in which a computing system is flooded with API requests to overload the system and disrupt the service. To protect against a DoS attack, current systems may block incoming API requests from identified sources of the attack.

In some cases, however, what appears to be a DoS attack may be caused accidentally by a legitimate source. For example, a legitimate API request that results in an error may cause the source system to retransmit the API request. This sequence may repeat continuously, thereby creating the impression that the source system is initiating a DoS attack. Current methods, such as blocking incoming API requests from the source of the API request, may not be suitable in this type of situation as the API requests are being transmitted for legitimate purposes. Accordingly, improvements are needed.

SUMMARY

A request throttling system monitors incoming API requests and applies delays to repeated API requests to avoid an overload and/or disruption in service. Upon receiving an API request from a requesting device, the request throttling system determines a counter value that is used to determine whether to apply a delay to API request. The counter value indicates a number or previous requests received from the requesting device that were directed to the same resource and which resulted in an error. The request throttling system compares the counter value to a threshold value to determine whether to apply a delay to the API request. Applying a delay reduces the speed at which subsequent repeat API requests are received from the requesting device, while still allowing for API requests from the requesting device to be processed.

In some embodiments, the length of the delay applied by the request throttling system may be variable based on the counter value. For example, the length of the delay applied by the request throttling system may increase as subsequent repetitive API requests are received. In this type of embodiment, the request throttling system uses multiple threshold value to determine the length of delay to apply to an API request.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for API request throttling. A request throttling system applies delays to repeated API requests to avoid an overload and/or disruption in service. Applying a delay to an API request reduces the speed at which subsequent repeat API requests are received from the requesting device, while still allowing for API requests from the requesting device to be processed.

Figure 1:
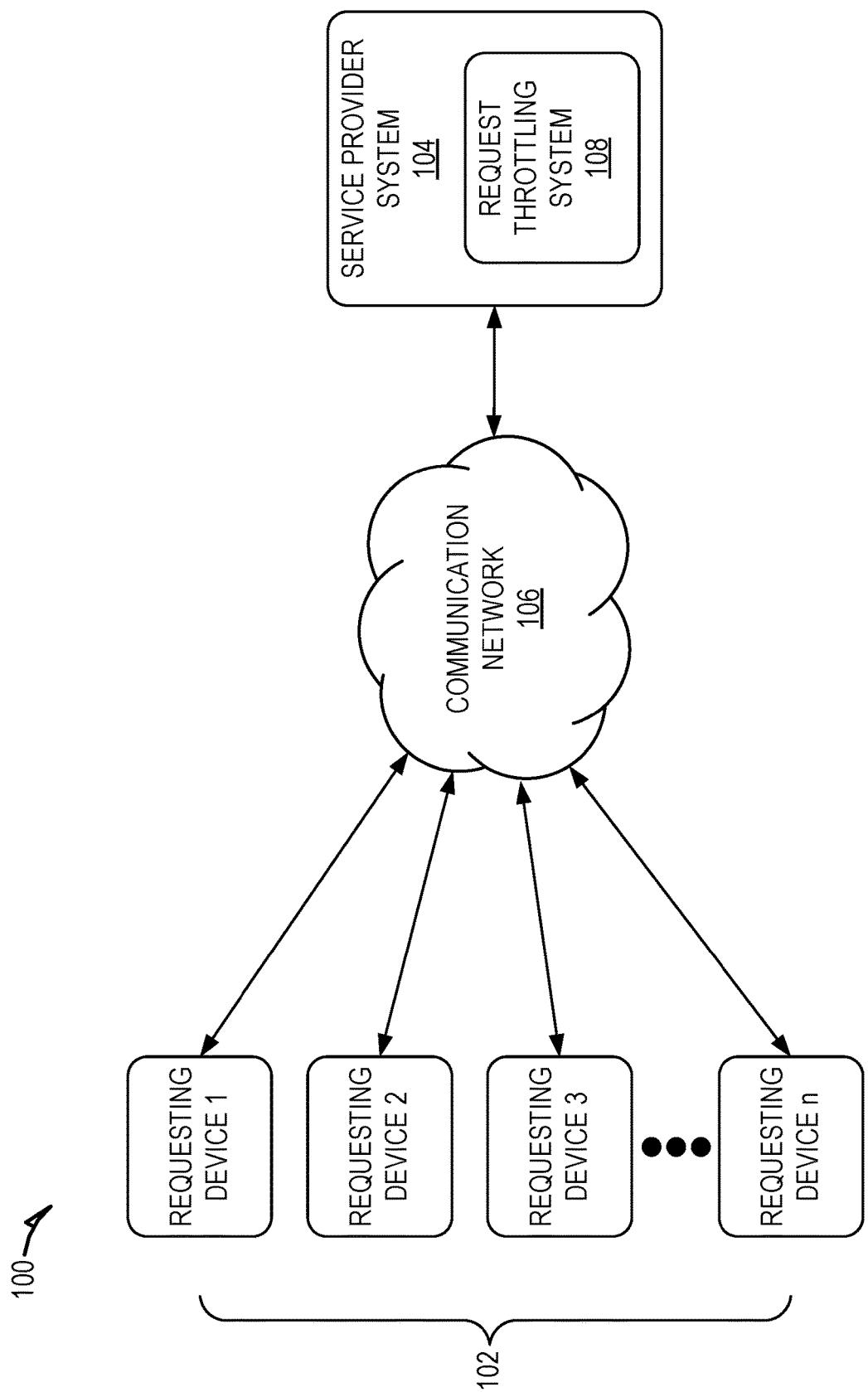
FIG. 1 shows a system for API request throttling, according to some example embodiments.

FIG. 1 shows a system 100 for API request throttling, according to some example embodiments. As shown, multiple devices (i.e., requesting devices 102 and service provider system 104) are connected to a communication network 106 and configured to communicate with each other through use of the communication network 106. The communication network 106 is any type of network, including a local area network (LAN), such as an intranet, a wide area network (WAN), such as the internet, a telephone and mobile device network, such as cellular network, or any combination thereof. Further, the communication network 106 may be a public network, a private network, or a combination thereof. The communication network 106 is implemented using any number of communication links associated with one or more service providers, including one or more wired communication links, one or more wireless communication links, or any combination thereof. Additionally, the communication network 106 is configured to support the transmission of data formatted using any number of protocols.

Multiple computing devices can be connected to the communication network 106. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 800 shown in FIG. 8.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The service provider system 104 provides any type of service that can be accessed via the communication network 106. For example, the service provider system 104 may provide an online service, such as a website, communication service, banking service, email service, retail service, travel service, and the like.

Requesting devices 102 may communicate with and utilize the functionality of the service provider system 104 through use of an API provided by the service provider system 104. The API defines the kinds of calls or requests that can be used to communicate and interact with the service provider system 104, how to initiate the calls or request, the data formats that should be used, the conventions to follow, and the like. Accordingly, the requesting devices 102 can use the API to transmit API requests to the service provider system 104.

Although the shown system 100 includes only four requesting devices 102 and one service provider system 104, this is only for ease of explanation and is not meant to be limiting. One skilled in the art would appreciate that the system 100 can include any number of requesting device 102 and/or service provider system 104. Further, each service provider system 104 may concurrently accept communications from and/or interact with any number of requesting devices 102, and support connections from a variety of different types of requesting devices 102, such as servers, desktop computers; mobile computers; mobile communications devices, e.g., mobile phones, smart phones, tablets; smart televisions; set-top boxes; and/or any other network enabled computing devices. Hence, the requesting devices 102 may be of varying type, capabilities, operating systems, and so forth.

API requests transmitted to the service provider system 104 by the requesting devices 102 are directed to various resources of the service provider system 104. For example, the API made available by the service provider system 104 may define the request paths for directing API requests to the various resources of the service provider system 104, as well as the functionality provided by the various resources. Upon receiving an API request, the service provider system 104 uses the request path included in the API request to forward API request to the appropriate resource, where it is processed. The resource may generate an API response to be returned to the requesting device 102. For example, API response may include a response code indicating whether the API request was successful or unsuccessful (e.g., resulted in an error).

A requesting device 102 may be configured to retransmit an API request that was unsuccessful (e.g., resulted in an error) until it is successfully processed by the service provider system 104. This can become problematic if the API request repeatedly fails as it will cause the requesting device 102 to retransmit repeated API requests that may overload the resource of the service provider system 104 as is the case with a DoS attack. Current methods with blocking DoS attacks, such as blocking incoming API requests from the requesting device 102, are not suitable in this type of situation as the repeated API requests are being transmitted for legitimate, rather nefarious, purposes.

To alleviate this issue, the service provider system 104 utilizes a request throttling system 108 that applies delays to repeated API requests to avoid an overload and/or disruption in service. The request throttling system 108 determines whether to apply a delay to an API request based on a counter value determined from previous API requests from the requesting device 102 that are directed to the same resource and resulted in an error. The request throttling system 108 compares the counter values to a threshold value and determines whether to apply a delay based on the comparison. For example, the request throttling system 108 applies a delay when the counter value meets or exceeds the threshold value. Alternatively, the request throttling system 108 does not apply a delay when the counter value is less than the threshold value. Applying a delay reduces the speed at which subsequent repeated API requests are transmitted by the requesting device 102 while still allowing for API requests from the requesting device 102 to be processed by the service provider system 104.

Figure 2:
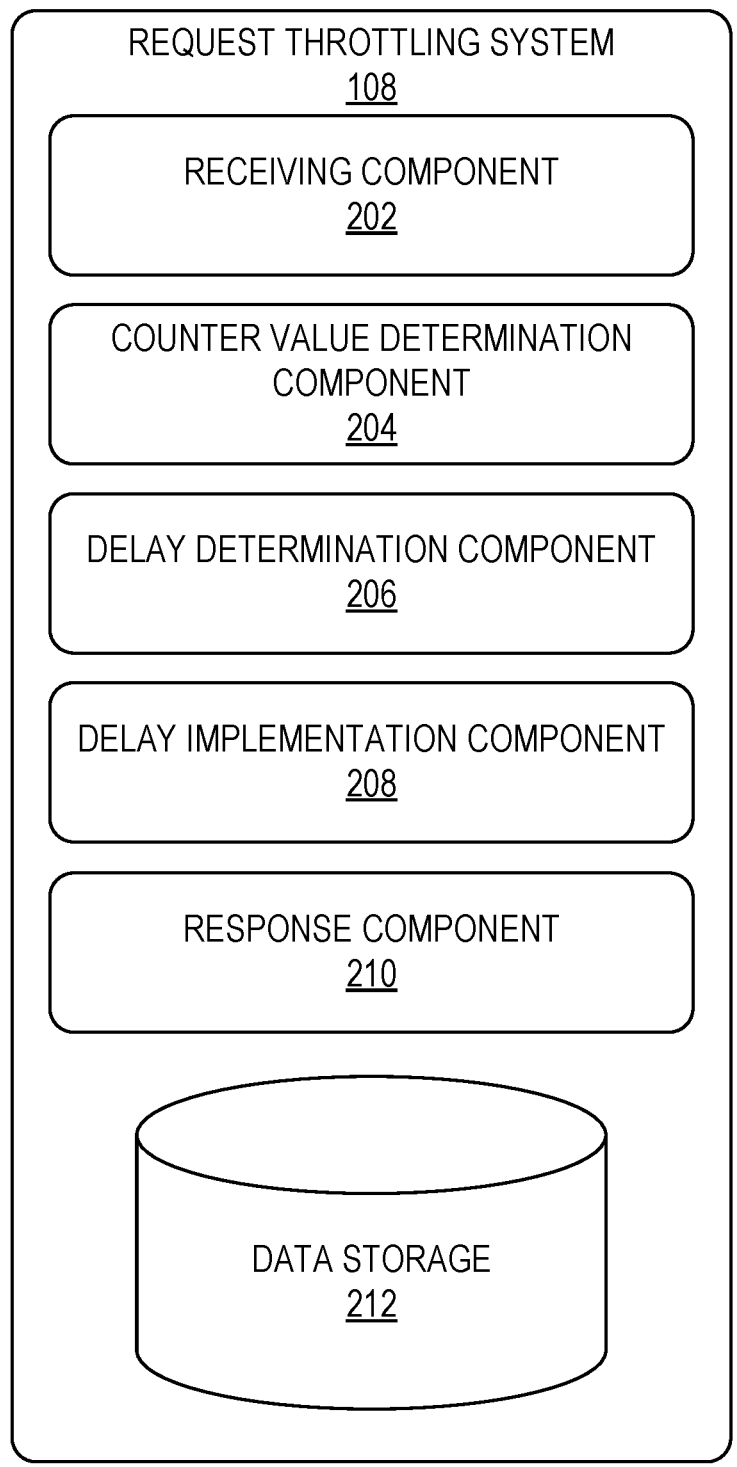
FIG. 2 is a block diagram of a request throttling system, according to some example embodiments.

FIG. 2 is a block diagram of a request throttling system 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the request throttling system 108 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the request throttling system 108 includes a receiving component 202, a counter value determination component 204, a delay determination component 206, a delay implementation component 208, a response component 210, and a data storage 212.

The receiving component 202 receives notifications indicating that an API request has been received by the service provider system 104. The service provider system 104 notifies the request throttling system 108 that an API request has been received prior to forwarding the API request to the appropriate resource of the service provider system 104 to be processed. The notification may include data associated with the received API request, such as data identifying the requesting device 102 (e.g., IP address) and data identifying the resource of the service provider system 104 to which the API request is directed (e.g., request path). The receiving component 202 provides data received in the notification to the other components of the request throttling system 108 and/or stores the data in the data storage 212, where it may be accessed by the other components of the request throttling system 108.

The counter value determination component 204 determines a counter value based on the received API request. As explained earlier, the request throttling system 108 may apply delays to repeated API requests to prevent an overload and/or disruption in service. The counter value indicates whether the API request is a repeated API request as well as the number of repeated API request that have been received. A repeated API request is an API request that was transmitted as a result of a previous API request resulting in an error. The repeated API request therefore originates from the same originating device 102 and is directed to the same resource of the service provider system 104 as the previous API request that resulted in an error.

The counter value determination component 204 determines the counter value based on previous messages that originated from the same originating device 102 and were directed to the same resource of the service provider system 104. For example, the counter value determination component 204 uses data included in the notification received by the receiving component 202 (e.g., IP address and request path) to identify a set of previous API messages that originated from the same IP address and were directed to the same request path.

The counter value determination component 204 uses the set of previous API messages to determine a number of the previous API messages that were sequentially received and resulted in a matching error. For example, if the most recent of the previous API messages did not result in an error, the counter value is determined to be 0. Alternatively, if the most recent of the previous API messages did result in an error, but the API message received sequentially prior to it did not result in the same error, the counter value is determined to be 1. As another example, if the three most recent API messages all resulted in the same error, the counter value is determined to be 3.

The counter value determination component 204 provides the counter value to the delay determination component 206, which determines whether to apply a delay to the API request. For example, the delay determination component 206 compares the counter value to a threshold value. If the counter value meets or exceeds the threshold value, the delay determination component 206 determines that a delay should be applied prior to the API request being processed. Alternatively, if the counter value does not meet or exceed the threshold value (e.g., is less than the threshold value), the delay determination component 206 determines that the API request can be processed without applying a delay.

In some embodiments, the threshold value used by the delay determination component 206 is a universal threshold value. For example, the delay determination component 206 may use the same universal threshold value for all API requests.

Alternatively, in some embodiments, the threshold value used by the delay determination component 206 may be based on the API request, such as being based on the response code (e.g., error), IP address and/or request path associated with the API request and/or the previous API requests. In this type of embodiment, different threshold values are used rather than a singular threshold value. For example, different threshold values may be used for different resources of the service provider system 104, response codes, and/or requesting devices 102.

In this type of embodiment, the delay determination component 206 uses the data associated with the API request and/or the identified set of previous API requests to identify the appropriate threshold value for determining whether to apply a delay. For example, the delay determination component 206 may use the request path to identify a threshold value associated with a resource of the service provider system 104. Similarly, the delay determination component 206 may use the IP address to identify the threshold value associated with the requesting device 102 and/or the response code to identify the threshold value associated with the specified error.

In addition to determining whether to apply a delay, the delay determination component 206 may also determine the length of the delay to apply. In some embodiments, the request throttling system 108 may increase the length of the delay used as subsequent repeated API requests are received from a requesting device 102. Using varying delays provides for longer delays when an API request is repeatedly failing and resulting in multiple repeated API requests.

In this type of embodiment, the delay determination component 206 uses a set of threshold values rather than a single threshold value. Each threshold value in the set of threshold values is associated with a delay length. Each delay length may indicate a time period, such as 10 second, 20 seconds, 1 minute, and the like.

The delay determination component 206 compares the counter value to the set of the threshold values to identify the highest threshold value that is met or exceeded by the counter value. The delay length associated with the identified highest threshold value is used when applying a delay in relation to the API request. Alternatively, a delay is not applied if the counter value does not meet or exceed any of the threshold values in the set of threshold values.

The delay determination component 206 notifies the delay implementation component 208 when a delay is to be applied to an API request. For example, the delay determination component 206 provides the delay implementation component 208 with the delay length to be applied. In turn, the delay implementation component 208 implements the requested delay. For example, the delay implementation component 208 causes a pause based on the delay length associated with the delay. After the delay has completed (e.g., the length of the delay has elapsed) the delay implementation component 208 instructs the response component 210 to notify the service provider system 104 to process the API request. As a result, the service provider system 104 forwards the API request to the corresponding resource to be processed.

Alternatively, if the delay determination component 206 determines that a delay should not be applied to the API request, the delay determination component 206 instructs the response component 210 to notify the service provider system 104 to process the API request. As a result, the service provider system 104 forwards the API request to the corresponding resource to be processed without a delay being implemented.

Figure 3A:
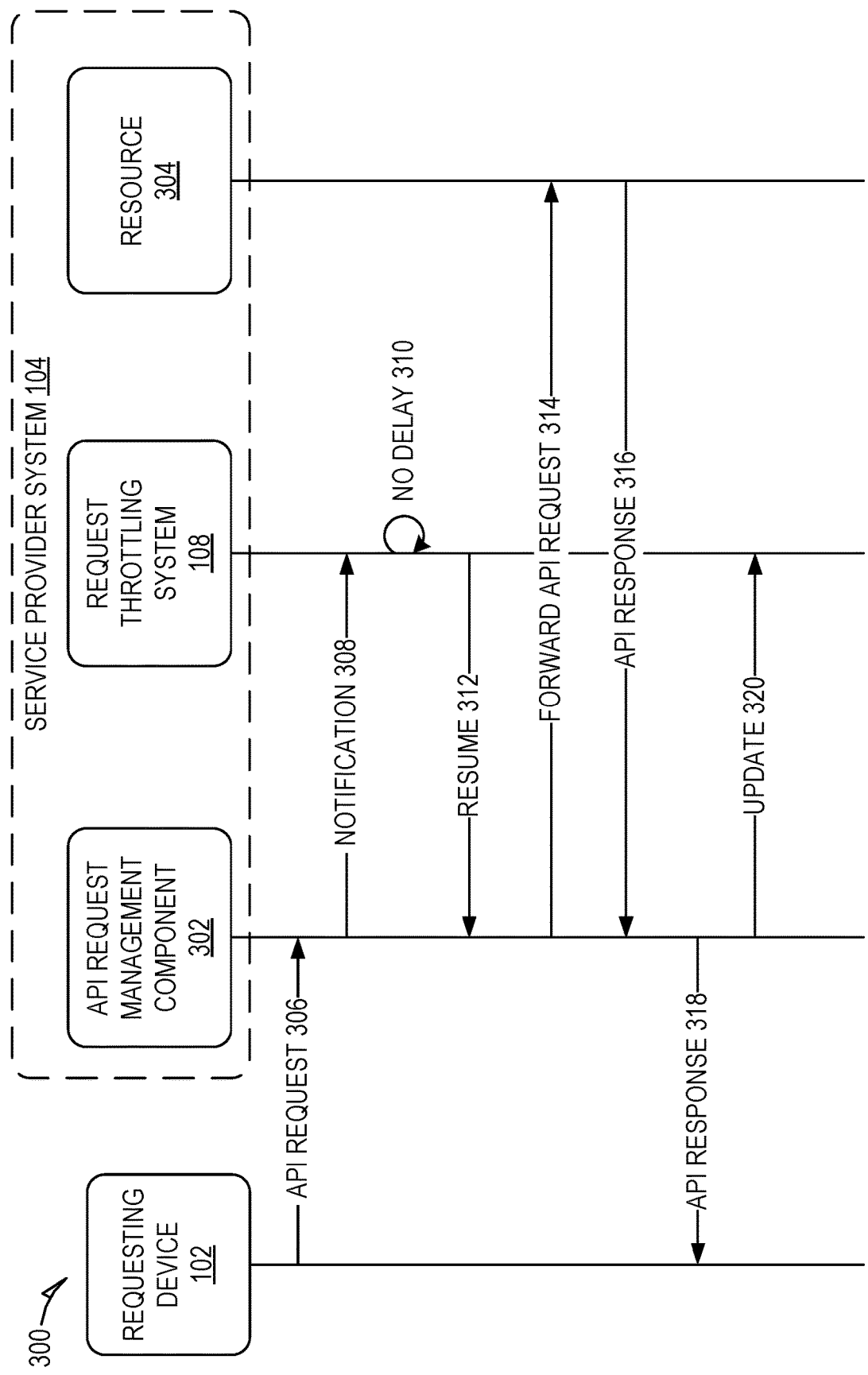
FIGS. 3A and 3B show communications within a system providing API request throttling, according to some example embodiments.
Figure 3B:
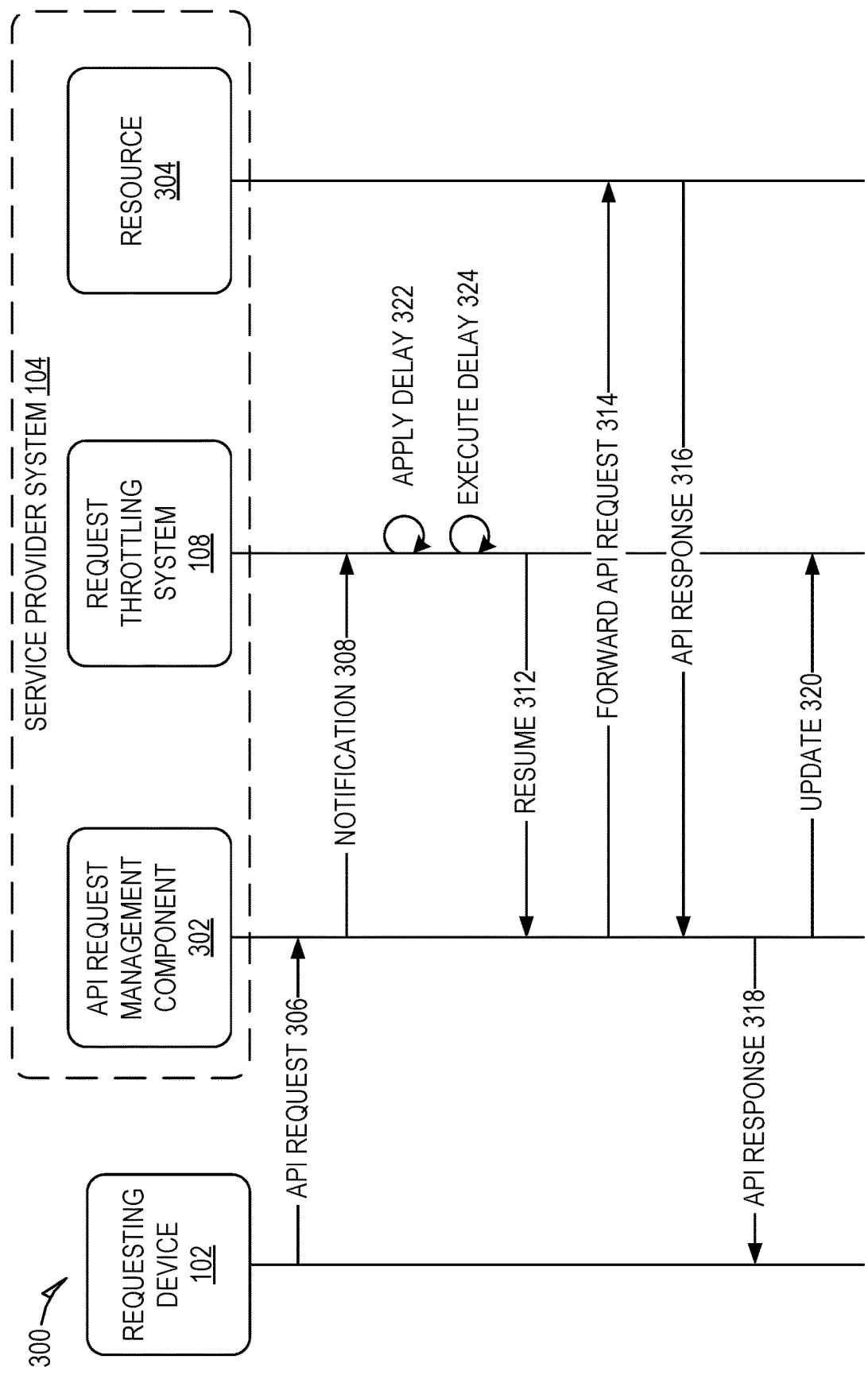

FIGS. 3A and 3B show communications within a system 300 providing API request throttling, according to some example embodiments. FIG. 3A shows an example in which a delay is not implemented to an API request 306. As shown, the requesting device 102 transmits an API request 306 to the service provider system 104. The API request 306 includes data identifying the requesting device 102, such as an originating IP address, as well as a request path identifying a resource 304 of the service provider system 104 to which the API request 306 is directed. The API request 306 is received by the API request management component 302.

The API request management component 302 transmits a notification 308 to the request throttling system 108, which determines whether to apply a delay prior to processing the API request 306. The notification 308 includes the originating IP address identifying the requesting device 102 and the request path identifying the resource 304. The request throttling system 108 uses the originating IP address and request path to determine 310 that a delay should not be applied. For example, the request throttling system 108 determines 310 that a counter value for the API request 306 is less than a threshold value. Accordingly, the request throttling system 108 notifies the API request management component 302 to resume 312 processing the API request 306 without having initiated a delay.

The API request management component 302 forwards 314 the API request 306 to the appropriate resource 304, where it is processed. The resource 304 generates an API response 316 that includes a response code indicating the result of processing the API request 306. This may include a response code indicating that the API request 306 was successfully processed or resulted in an error. The API response 316 is returned to the API request management component 302, which in turn forwards the API response 318 to the requesting device 102. The API request management component 302 also updates 320 the request throttling system 108 based on the API response 316. This may include providing the request throttling system 108 with the response code included in the API response 316.

The request throttling system 108 generates/updates its records based on the update 320 received from the API request management component 302. The updated records can be subsequently used by the request throttling system 108 in determining whether to apply a delay to an API request 306.

FIG. 3B shows an example in which a delay is implemented to an API request 306. As shown, the requesting device 102 transmits an API request 306 to the service provider system 104. The API request 306 includes data identifying the requesting device 102, such as an originating IP address, as well as a request path identifying a resource 304 of the service provider system 104 to which the API request 306 is directed. The API request 306 is received by the API request management component 302.

The API request management component 302 transmits a notification 308 to the request throttling system 108, which determines whether to apply a delay prior to processing the API request 306. The notification 308 includes the originating IP address identifying the requesting device 102 and the request path identifying the resource 304.

In contrast to the operations shown in FIG. 3A, in FIG. 3B the request throttling system 108 determines 322 that a delay should be applied. For example, the request throttling system 108 determines 322 that a counter value for the API request 306 meets or exceeds a threshold value. Accordingly, the request throttling system 108 executes a delay 324. After determining that the delay 324 has completed, the request throttling system 108 notifies the API request management component 302 to resume 312 processing the API request 306 and the communications proceed in a similar manner as described in relation to FIG. 3A. For example, the API request management component 302 forwards the API request 306 to the appropriate resource 304, where the API request 306 is processed. The resource 304 generates an API response 316 that includes a response code indicating the result of processing the API request 306 and transmits the API response 316 to the API request management component 302. In turn, the API request management component 302 forwards the API response 318 to the requesting device 102 and updates 320 the request throttling system 108 based on the API response 316.

Figure 4:
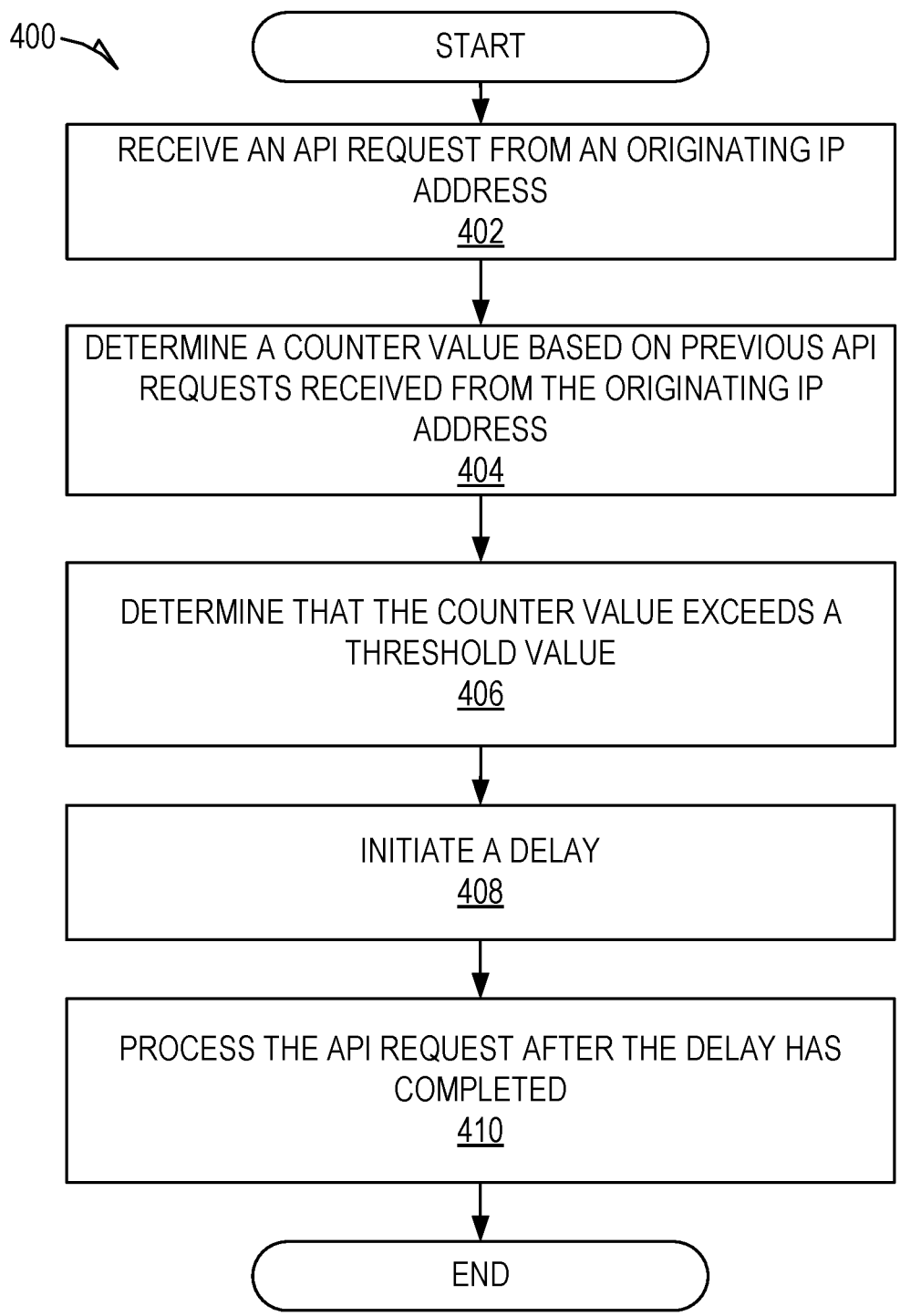
FIG. 4 is a flow diagram of a method for API request throttling when a counter value exceeds a threshold value, according to some example embodiments.

FIG. 4 is a flow diagram of a method 400 for API request throttling when a counter value exceeds a threshold value, according to some example embodiments. The method 400 may be embodied in computer readable instructions for execution by one or more computer processors such that the operations of the method 400 may be performed in part or in whole by the request throttling system 108; accordingly, the method 400 is described below by way of example with reference to the request throttling system 108. However, it shall be appreciated that at least some of the operations of the method 400 may be deployed on various other hardware and/or software configurations and the method 400 is not intended to be limited to the request throttling system 108.

At operation 402, the service provider system 104 receives an API request from an originating IP address. The API request includes an originating IP address that identifies the requesting device 102 that transmitted the API request, as well as a request path identifying a resource of the service provider system 104 to which the API request is directed.

At operation 404, the counter value determination component 204 determines a counter value based on previous API requests received from the originating IP address. As explained earlier, the request throttling system 108 may apply delays to repeated API requests to prevent an overload and/or disruption in service. The counter value indicates whether the API request is a repeated API request as well as the number of repeated API request that have been received. A repeated API request is an API request that was transmitted as a result of a previous API request resulting in an error. The repeated API request therefore originated from the same originating device 102 and is directed to the same resource of the service provider system 104 as the previous API request that resulted in an error.

The counter value determination component 204 determines the counter value based on previous messages that originated from the same originating device 102 and that were directed to the same resource of the service provider system 104. For example, the counter value determination component 204 uses the originating IP address and request path to identify a set of previous API messages that originated from the same IP address and that were directed to the same request path. The counter value determination component 204 uses the set of previous API messages to determine a number of the previous API messages that were sequentially received and resulted in a matching error.

At operation 406, the delay determination component 206 determines that the counter value exceeds a threshold value. The delay determination component 206 determines whether to apply a delay to the API request by comparing the counter value to a threshold value. If the counter value meets or exceeds the threshold value, the delay determination component 206 determines that a delay should be applied prior to the API request being processed. Alternatively, if the counter value does not meet or exceed the threshold value (e.g., is less than the threshold value), the delay determination component 206 determines that the API request can be processed without applying a delay.

At operation 408, the delay implementation component 208 initiates a delay. For example, the delay implementation component 208 causes a pause based on the delay length associated the delay, after which the delay implementation component 208 instructs the response component 210 to notify the service provider system 104 to process the API request.

At operation 410, the service provider system 104 processes the API request after the delay has completed. For example, the service provider system 104 forwards the API request to the corresponding resource to be processed.

Figure 5:
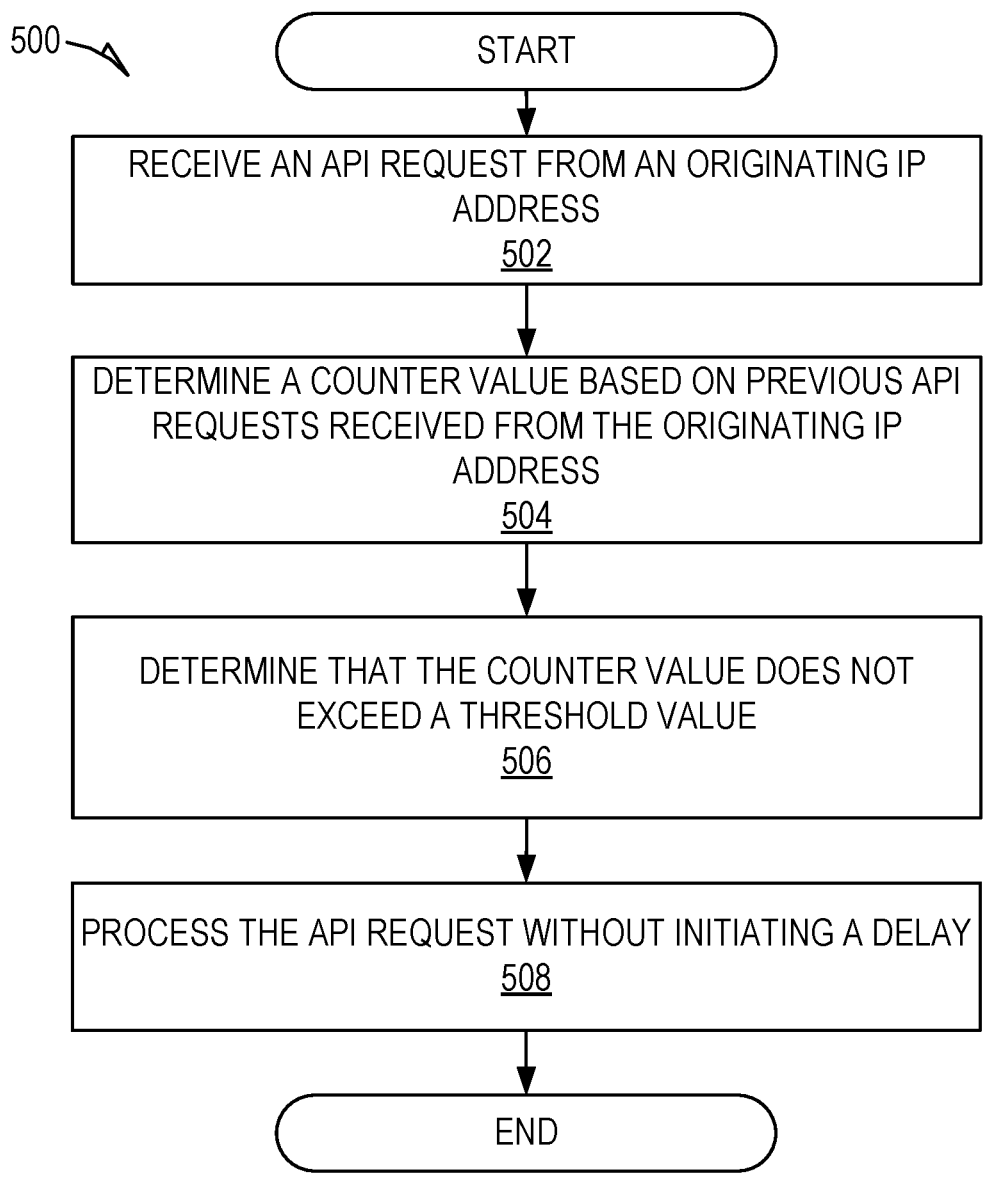
FIG. 5 is a flow diagram of a method for API request throttling when a counter value does not exceed a threshold value, according to some example embodiments.

FIG. 5 is a flow diagram of a method 500 for API request throttling when a counter value does not exceed a threshold value, according to some example embodiments. The method 500 may be embodied in computer readable instructions for execution by one or more computer processors such that the operations of the method 500 may be performed in part or in whole by the request throttling system 108; accordingly, the method 500 is described below by way of example with reference to the request throttling system 108. However, it shall be appreciated that at least some of the operations of the method 500 may be deployed on various other hardware and/or software configurations and the method 500 is not intended to be limited to the request throttling system 108.

At operation 502, the service provider system 104 receives an API request from an originating IP address. The API request includes an originating IP address that identifies the requesting device 102 that transmitted the API request, as well as a request path identifying a resource of the service provider system 104 to which the API request is directed.

At operation 504, the counter value determination component 204 determines a counter value based on previous API requests received from the originating IP address. As explained earlier, the request throttling system 108 may apply delays to repeated API requests to prevent an overload and/or disruption in service. The counter value indicates whether the API request is a repeated API request as well as the number of repeated API request that have been received. A repeated API request is an API request that was transmitted as a result of a previous API request resulting in an error. The repeated API request therefore originated from the same originating device 102 and is directed to the same resource of the service provider system 104 as the previous API request that resulted in an error.

The counter value determination component 204 determines the counter value based on previous messages that originated from the same originating device 102 and that were directed to the same resource of the service provider system 104. For example, the counter value determination component 204 uses the originating IP address and request path to identify a set of previous API messages that originated from the same IP address and were directed to the same request path. The counter value determination component 204 uses the set of previous API messages to determine a number of the previous API messages that were sequentially received and resulted in a matching error.

At operation 506, the delay determination component 206 determines that the counter value does not exceed a threshold value. To determine whether to apply a delay, the delay determination component 206 compares the counter value to a threshold value. If the counter value meets or exceeds the threshold value, the delay determination component 206 determines that a delay should be applied prior to the API request being processed. Alternatively, if the counter value does not meet or exceed the threshold value (e.g., is less than the threshold value), the delay determination component 206 determines that the API request can be processed without applying a delay.

At operation 508, the service provider system 104 processes the API request without initiating a delay. For example, the service provider system 104 forwards the API request to the corresponding resource to be processed.

Figure 6:
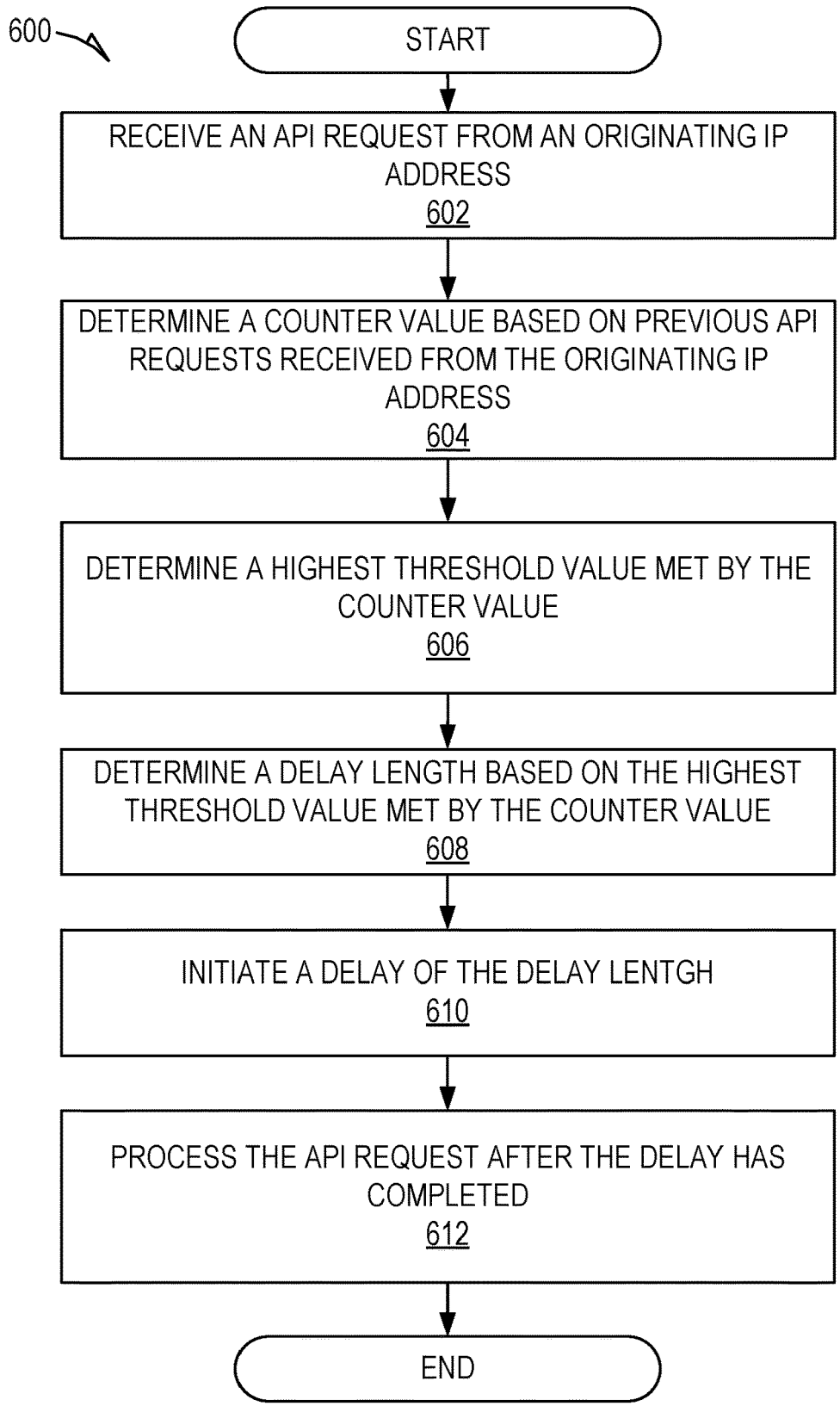
FIG. 6 is a flow diagram of a method for API request throttling using delays with varying lengths, according to some example embodiments.

FIG. 6 is a flow diagram of a method 600 for API request throttling using delays with varying lengths, according to some example embodiments. The method 600 may be embodied in computer readable instructions for execution by one or more computer processors such that the operations of the method 600 may be performed in part or in whole by the request throttling system 108; accordingly, the method 600 is described below by way of example with reference to the request throttling system 108. However, it shall be appreciated that at least some of the operations of the method 600 may be deployed on various other hardware and/or software configurations and the method 600 is not intended to be limited to the request throttling system 108.

At operation 602, the service provider system 104 receives an API request from an originating IP address. The API request includes an originating IP address that identifies the requesting device 102 that transmitted the API request, as well as a request path identifying a resource of the service provider system 104 to which the API request 306 is directed.

At operation 604, the counter value determination component 204 determines a counter value based on previous API requests received from the originating IP address. As explained earlier, the request throttling system 108 may apply delays to repeated API requests to prevent an overload and/or disruption in service. The counter value indicates whether the API request is a repeated API request as well as the number of repeated API request that have been received. A repeated API request is an API request that was transmitted as a result of a previous API request resulting in an error. The repeated API request therefore originated from the same originating device 102 and is directed to the same resource of the service provider system 104 as the previous API request that resulted in an error.

The counter value determination component 204 determines the counter value based on previous messages that originated from the same originating device 102 and that were directed to the same resource of the service provider system 104. For example, the counter value determination component 204 uses the originating IP address and request path to identify a set of previous API messages that originated from the same IP address and were directed to the same request path. The counter value determination component 204 uses the set of previous API messages to determine a number of the previous API messages that were sequentially received and resulted in a matching error.

At operation 606, the delay determination component 206 determines a highest threshold value met by the counter value. The delay determination component 206 determines whether to apply a delay to the API request by comparing the counter value to a threshold value. If the counter value meets or exceeds the threshold value, the delay determination component 206 determines that a delay should be applied prior to the API request being processed. Alternatively, if the counter value does not meet or exceed the threshold value (e.g., is less than the threshold value), the delay determination component 206 determines that the API request can be processed without applying a delay.

In some embodiments, the delay determination component 206 may also determine the length of the delay to apply. For example, the request throttling system 108 may increase the length of the delay used as subsequent repeated API requests are received from a requesting device 102. Using varying delays provides for longer delays when an API request is repeatedly failing and resulting in multiple repeated API requests.

In this type of embodiment, the delay determination component 206 uses a set of threshold values rather than a single threshold value. Each threshold value in the set of threshold values is associated with a delay length. Each delay length may indicate a time period, such as 10 second, 20 seconds, 1 minute, and the like.

The delay determination component 206 compares the counter value to the set of the threshold values to identify the highest threshold value that is met or exceeded by the counter value. The delay length associated with the identified highest threshold value is used when applying a delay in relation to the API request. Alternatively, a delay is not applied if the counter value does not meet or exceed any of the threshold values in the set of threshold values.

At operation 608, the delay determination component 206 determines a delay length based on the highest threshold value met by the counter value. For example, the delay determination component 206 determines the delay length based on the delay length associated with the highest threshold value met by the counter value.

At operation 610, the delay implementation component 208 initiates a delay of the delay length. For example, the delay implementation component 208 causes a pause based on the delay length associated the delay. After determining that the delay length has elapsed, the delay implementation component 208 instructs the response component 210 to notify the service provider system 104 to process the API request.

At operation 612, the service provider system 104 processes the API request after the delay has completed. For example, the service provider system 104 forwards the API request to the corresponding resource to be processed.

Software Architecture

Figure 7:
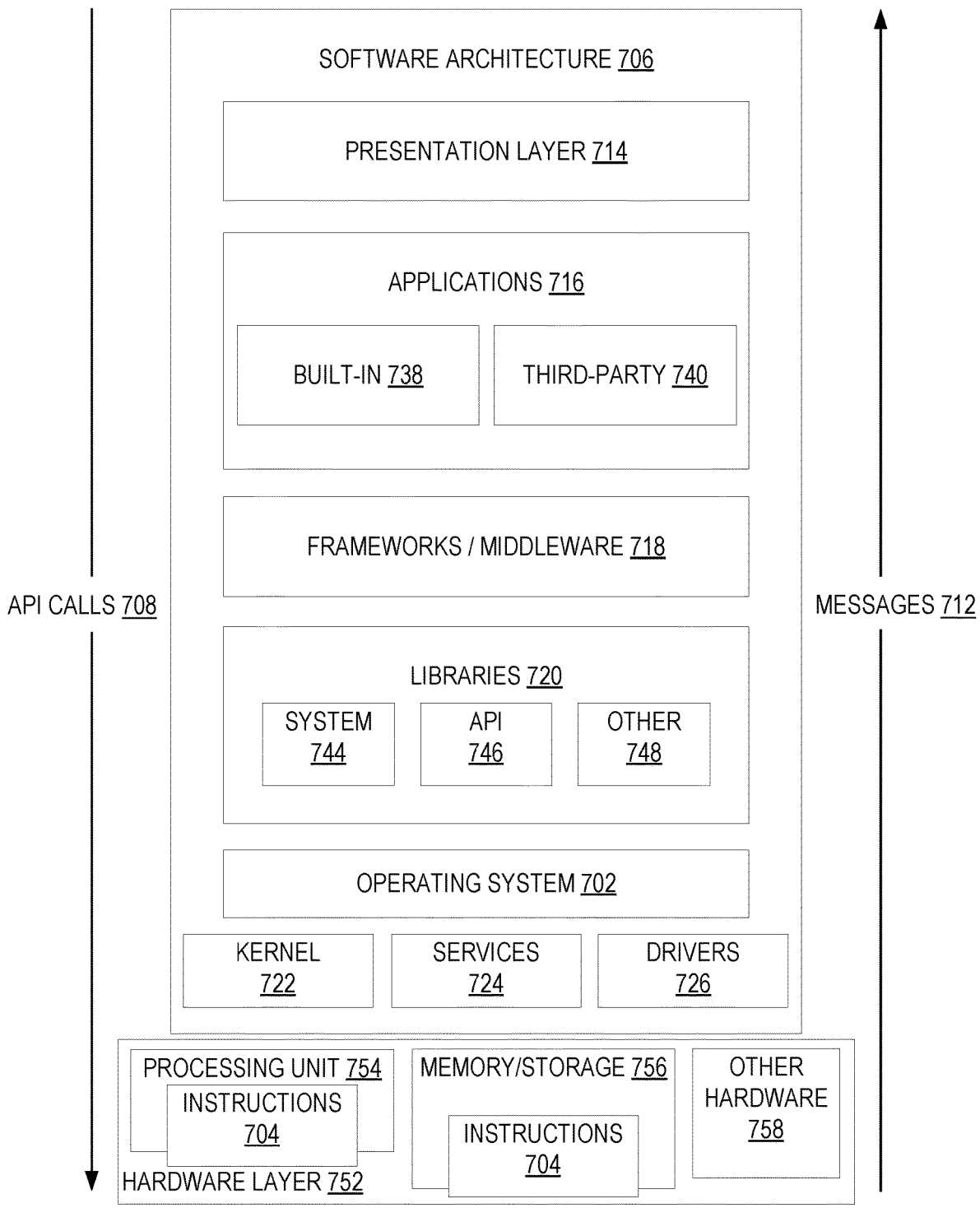
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating an example software architecture 706, which may be used in conjunction with various hardware architectures herein described. FIG. 7 is a non-limiting example of a software architecture 706 and it will be appreciated that many other architectures may be implemented to facilitate the functionality described herein. The software architecture 706 may execute on hardware such as machine 800 of FIG. 8 that includes, among other things, processors 804, memory 814, and (input/output) I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage modules 756, which also have executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke application programming interface (API) calls 708 through the software stack and receive a response such as messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphical user interface (GUI) functions, high-level resource management, high-level location services, and so forth. The frameworks/middleware 718 may provide a broad spectrum of other APIs that may be used by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724, and/or drivers 726), libraries 720, and frameworks/middleware 718 to create UIs to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
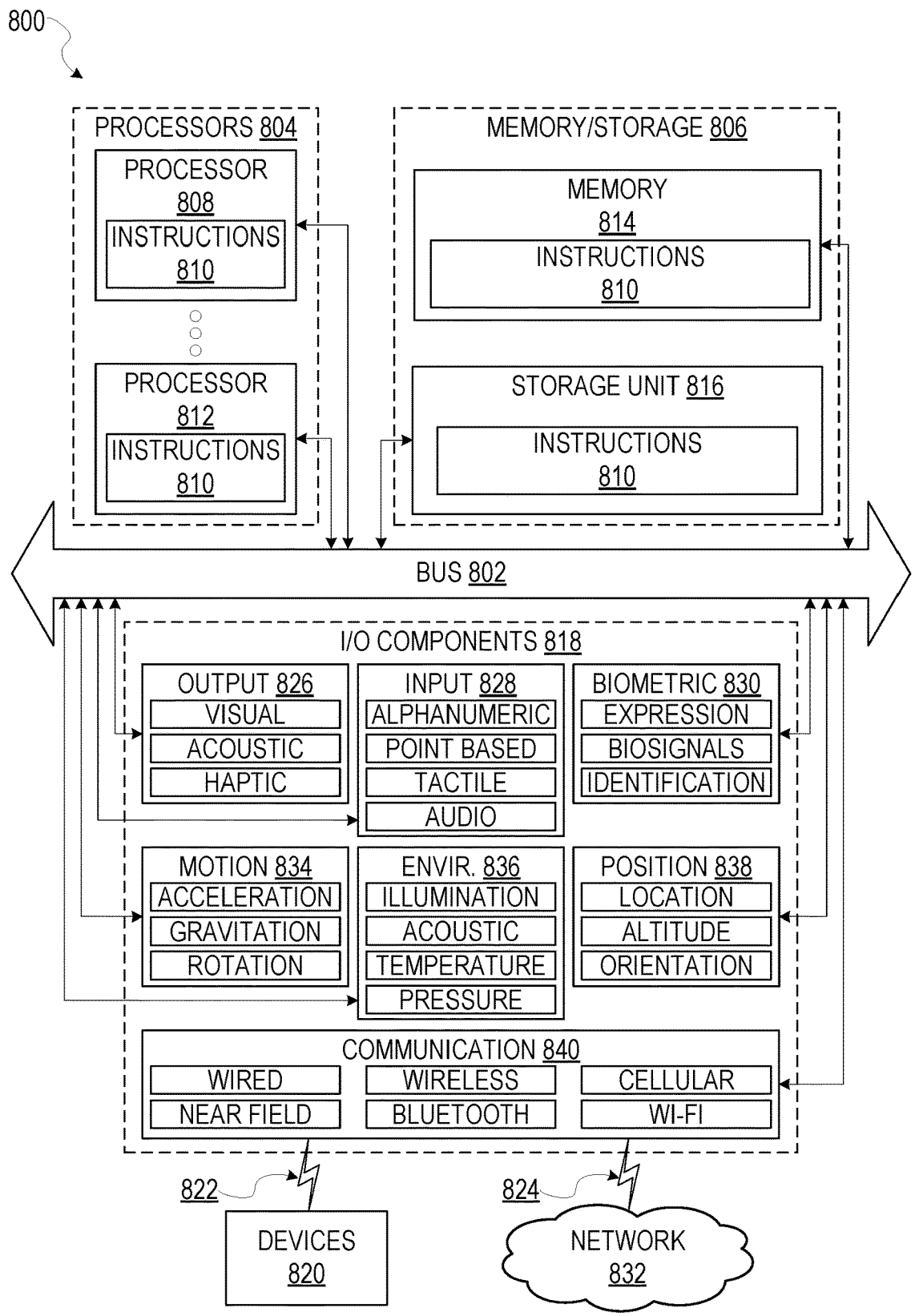
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 704 from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 800 capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 824 and coupling 822, respectively. For example, the communication components 840 may include a network interface component or other suitable device to interface with the network 832. In further examples, communication components 840 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 810 for execution by the machine 800, and includes digital or analog communications signals or other intangible medium to facilitate communication of such instructions 810. Instructions 810 may be transmitted or received over the network 832 using a transmission medium via a network interface device and using any one of a number of well-known transfer protocols.

"CLIENT DEVICE" in this context refers to any machine 800 that interfaces to a communications network 832 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 832.

"COMMUNICATIONS NETWORK" in this context refers to one or more portions of a network 832 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 832 or a portion of a network 832 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 810 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 810. The term "machine-readable medium" shall also be taken to include any medium, or combination of multiple media, that is capable of storing instructions 810 (e.g., code) for execution by a machine 800, such that the instructions 810, when executed by one or more computer processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 804) may be configured by software (e.g., an application 716 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 804 or other programmable processor 804. Once configured by such software, hardware components become specific machines 800 (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 804 configured by software to become a special-purpose processor, the general-purpose processor 804 may be configured as respectively different special-purpose processors (e.g., comprising different hardware components) at different times. Software accordingly configures a particular processor or processors 804, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more computer processors 804 that are temporarily configured (e.g., by software) or permanently configured to perform the relevant operations. Whether temporarily or permanently configured, such processors 804 may constitute processor-implemented components that operate to perform one or more operations or functions described herein. As used herein, "processor-implemented component" refers to a hardware component implemented using one or more computer processors 804. Similarly, the methods described herein may be at least partially processor-implemented, with a particular processor or processors 804 being an example of hardware. For example, at least some of the operations of a method may be performed by one or more computer processors 804 or processor-implemented components. Moreover, the one or more computer processors 804 may also operate to support performance of the relevant operations in a "cloud computing" environment or as a "software as a service" (SaaS). For example, at least some of the operations may be performed by a group of computers (as examples of machines 800 including processors 804), with these operations being accessible via a network 832 (e.g., the Internet) and via one or more appropriate interfaces (e.g., an API). The performance of certain of the operations may be distributed among the processors 804, not only residing within a single machine 800, but deployed across a number of machines 800. In some example embodiments, the processors 804 or processor-implemented components may be located in a single geographic location (e.g., within a home environment, an office environment, or a server farm). In other example embodiments, the processors 804 or processor-implemented components may be distributed across a number of geographic locations.

"PROCESSOR" in this context refers to any circuit or virtual circuit (a physical circuit emulated by logic executing on an actual processor 804) that manipulates data values according to control signals (e.g., "commands," "op codes," "machine code," etc.) and which produces corresponding output signals that are applied to operate a machine 800. A processor 804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 804 may further be a multi-core processor having two or more independent processors 804 (sometimes referred to as "cores") that may execute instructions 810 contemporaneously.

What is claimed is:
1. A method comprising:
   receiving an Application Programming Interface (API) request having originated from an Internet Protocol (IP) address;
   determining a counter value based on one or more previous API requests having originated from the IP address and one or more responses that each comprise a response code indicating whether a respective previous API request originated from the IP address has resulted in an error;

in response to determining that the counter value satisfies a threshold criterion, initiating a delay in processing of the API request; and in response to determining that the delay has completed, causing the processing of the API request to resume, wherein the processing of the API request comprises:

forwarding the API request to a resource based on a request path included in the API request;

receiving an API response from the resource in response to the API request;

transmitting the API response to the originating IP address; and updating the one or more previous API requests having originated from the IP address based on the API response.

2. The method of claim 1, further comprising:

receiving a second API request having originated from the IP address;

determining an updated counter value based on previous API requests having originated from the IP address;

in response to determining that counter value satisfies a second threshold criterion, initiating a second delay in relation to the second API request, the second threshold criterion being associated with a value higher than a value associated with the threshold criterion and the second delay being a different length than the delay; and in response to determining that the second delay has completed, causing the processing of the second API request.

3. The method of claim 1, further comprising:

receiving a second API request having originated from the IP address;

determining an updated counter value based on previous API requests having originated from the IP address; and in response to determining that the updated counter value does not satisfy the threshold criterion, processing the second API request without initiating the delay.

4. The method of claim 1, further comprising:

receiving a second API request having originated from a second IP address;

determine a second counter value based on previous API requests having originated from the second IP address; and in response to determining that the second counter value does not satisfy the threshold criterion, processing the second API request without initiating the delay.

5. The method of claim 1, wherein determining the counter value comprises:

determining a number of the previous API requests having originated from the IP address and having produced the one or more responses comprising the response code indicating that the previous API requests originated from the IP address have resulted in a matching error.

6. A system comprising: one or more computer processors; and one or more computer-readable mediums storing instructions that, when executed by the one or more computer processors, cause the system to perform operations comprising:

receiving an Application Programming Interface (API) request having originated from an Internet Protocol (IP) address;

determining a counter value based on one or more previous API requests having originated from the IP address and one or more responses that each comprise a response code indicating whether a respective previous API request originated from the IP address has resulted in an error;

in response to determining that the counter value satisfies a threshold criterion, initiating a delay in processing of the API request; and in response to determining that the delay has completed, causing the processing of the API request to resume, Wherein the processing the API request comprises:

forwarding the API request to a resource based on a request path included in the API request;

receiving an API response from the resource in response to the API request; and transmitting the API response to the originating IP address and;

updating the previous API requests having originated from the IP address based on the API response.

7. The system of claim 6, the operations further comprising:

receiving a second API request having originated from the IP address;

determining an updated counter value based on previous API requests having originated from the IP address;

in response to determining that counter value satisfies a second threshold criterion, initiating a second delay in relation to the second API request, the second threshold criterion being associated with a value higher than a value associated with the threshold criterion and the second delay being a different length than the delay; and in response to determining that the second delay has completed, causing the processing of the second API request.

8. The system of claim 6, the operations further comprising:

receiving a second API request having originated from the IP address;

determining an updated counter value based on previous API requests having originated from the IP address; and in response to determining that the updated counter value does not satisfy the threshold criterion, processing the second API request without initiating the delay.

9. The system of claim 6, the operations further comprising:

receiving a second API request having originated from a second IP address;

determine a second counter value based on previous API requests having originated from the second IP address; and in response to determining that the second counter value does not satisfy the threshold criterion, processing the second API request without initiating the delay.

10. The system of claim 6, wherein determining the counter value comprises:

determining a number of the previous API requests having originated from the IP address and having produced the one or more responses comprising the response code indicating that the previous API requests originated from the IP address have resulted in a matching error.

11. A non-transitory computer-readable medium storing instructions that, when executed by one or more computer processors of one or more computing devices, cause the one or more computing devices to perform operations comprising:

receiving an Application Programming Interface (API) request having originated from an Internet Protocol (IP) address;

determining a counter value based on one or more previous API requests having originated from the IP address and one or more responses that each comprise a response code indicating whether a respective previous API request originated from the IP address has resulted in an error;

in response to determining that the counter value satisfies a threshold criterion, initiating a delay in processing of the API request; and in response to determining that the delay has completed, causing the processing of the API request to resume, wherein the processing the API request comprises:

forwarding the API request to a resource based on a request path included in the API request;

receiving an API response from the resource in response to the API request;

transmitting the API response to the originating IP address; and updating the previous API requests having originated from the IP address based on the API response.

12. The non-transitory computer-readable medium of claim 11, the operations further comprising:

receiving a second API request having originated from the IP address;

determining an updated counter value based on previous API requests having originated from the IP address;

in response to determining that counter value satisfies a second threshold criterion, initiating a second delay in relation to the second API request, the second threshold criterion being associated with a value higher than a value associated with the threshold criterion and the second delay being a different length than the delay; and in response to determining that the second delay has completed, causing the processing of the second API request.

13. The non-transitory computer-readable medium of claim 11, the operations further comprising:

receiving a second API request having originated from the IP address;

determining an updated counter value based on previous API requests having originated from the IP address; and in response to determining that the updated counter value does not satisfy the threshold criterion, processing the second API request without initiating the delay.

14. The non-transitory computer-readable medium of claim 11, the operations further comprising:

receiving a second API request having originated from a second IP address;

determine a second counter value based on previous API requests having originated from the second IP address; and in response to determining that the second counter value does not satisfy the threshold criterion, processing the second API request without initiating the delay.

15. The non-transitory computer-readable medium of claim 11, wherein determining the counter value comprises:

determining a number of the previous API requests having originated from the IP address and having produced the one or more responses comprising the response code indicating that the previous API requests originated from the IP address have resulted in a matching error.

* * * * *